US006971413B2

(12) United States Patent
Taylor et al.

(10) Patent No.: US 6,971,413 B2
(45) Date of Patent: Dec. 6, 2005

(54) APPARATUS FOR REPAIRING AN UNDERWATER PIPE

(75) Inventors: Neil John Thornton Taylor, Hertfordshire (GB); Ian Richard Webb, Buckinghamshire (GB)

(73) Assignee: Taylor Kerr ( Couplings) Limited, Buckinghamshire (GB)

( * ) Notice: Subject to any disclaimer, the term of this patent is extended or adjusted under 35 U.S.C. 154(b) by 0 days.

(21) Appl. No.: 10/745,325

(22) Filed: Dec. 23, 2003

(65) Prior Publication Data

US 2004/0163723 A1  Aug. 26, 2004

(30) Foreign Application Priority Data

Dec. 23, 2002  (GB) .................................... 0230046

(51) Int. Cl.⁷ .......................... F16L 55/16; F16L 17/04
(52) U.S. Cl. ............................ 138/99; 138/97; 24/270; 285/15; 285/411
(58) Field of Search ...................... 138/99, 97; 24/279, 24/270, 272; 285/15, 367, 411, 363, 10

(56) References Cited

U.S. PATENT DOCUMENTS

| | | | | |
|---|---|---|---|---|
| 962,566 | A | * | 6/1910 | Gerth ........................... 138/99 |
| 1,290,041 | A | * | 1/1919 | Anderson ..................... 138/99 |
| 1,343,463 | A | * | 6/1920 | Davies ......................... 138/99 |
| 1,649,752 | A | * | 11/1927 | Stone .......................... 285/419 |
| 2,417,741 | A | * | 3/1947 | Dillon ......................... 285/373 |
| 2,913,262 | A | * | 11/1959 | De Cenzo et al. .......... 285/233 |
| 3,189,970 | A | * | 6/1965 | Barr ............................. 24/284 |
| 3,770,301 | A | * | 11/1973 | Adams ......................... 285/15 |
| 4,240,650 | A | * | 12/1980 | Adams ......................... 285/10 |
| 4,365,393 | A | * | 12/1982 | Hauffe et al. ................ 24/279 |
| 4,381,020 | A | * | 4/1983 | Daghe et al. ................ 138/99 |
| 4,438,958 | A | * | 3/1984 | De Cenzo .................... 285/234 |
| 4,535,822 | A |   | 8/1985 | Rogers, Jr. ................... 138/99 |
| 4,630,647 | A | * | 12/1986 | Thomson ..................... 138/99 |
| 4,657,284 | A | * | 4/1987 | Fiori ............................. 285/39 |
| 4,697,830 | A | * | 10/1987 | Wood et al. ................. 285/27 |
| 4,885,122 | A | * | 12/1989 | Stapleton .................... 376/203 |
| 5,437,489 | A | * | 8/1995 | Sanders et al. .............. 294/88 |

(Continued)

FOREIGN PATENT DOCUMENTS

EP          0 241 584        10/1987

(Continued)

OTHER PUBLICATIONS

Search Report dated Mar. 25, 2004, in United Kingdom Application No. GB 0230046.5, 4 pages.

*Primary Examiner*—Patrick Brinson
(74) *Attorney, Agent, or Firm*—Flynn, Thiel, Boutell & Tanis, P.C.

(57) ABSTRACT

A pipe clamp 10 for repairing an underwater pipe. The pipe clamp 10 comprises a plurality of part-cylindrical portions 12,14,16 hinged together along a hinge axis or axes 27 along adjacent longitudinal edges 17,18. Two or the longitudinal edges 20,21 of the part-cylindrical portions are free. The part-cylindrical portions 12,14,16 are movable about the hinge axis or axes 27 towards and away from one another between an open position in which the free longitudinal edges 20,21 are spaced apart and the clamp 10 can be placed around a pipe and a closed position in which, in use, the free longitudinal edges 20,21 of the part-cylindrical portions 12,14,16 are brought together around the pipe. Fastening means are provided for holding the free edges 20,21 of the part-cylindrical portions 12,14,16 together, such that, in use, the clamp 10 is held to the pipe.

28 Claims, 6 Drawing Sheets

U.S. PATENT DOCUMENTS 5,639,102 A * 6/1997 Ilesic .................. 277/607
5,692,544 A    12/1997 Friedrich et al. ............ 138/99
6,056,332 A *  5/2000 Foster .................. 285/367

FOREIGN PATENT DOCUMENTS

| | | |
|---|---|---|
| FR | 2 605 083 | 4/1988 |
| GB | 7782 | 7/1909 |
| GB | 116 863 | 6/1918 |
| GB | 2 080 476 | 2/1982 |
| GB | 2 159 597 | 12/1985 |
| GB | 2 200 420 | 8/1988 |
| GB | 2 201 746 | 9/1988 |
| GB | 2 387 212 | 10/2003 |

* cited by examiner

APPARATUS FOR REPAIRING AN UNDERWATER PIPE

The present invention relates to a pipe clamp for repairing an underwater pipe, and a method of repairing an underwater pipe.

BACKGROUND OF THE INVENTION

Pipes located deep under the sea are used extensively for the transportation of oil, natural gas and other fluids. Pipes, and in particular flexible pipes, are highly susceptible to corrosion which damages the pipes and can cause leaks. Flexible pipes used as dynamic risers are designed to withstand a dynamic load. If the pipe is damaged, its ability to withstand such loads is significantly reduced.

When a pipe becomes damaged, the pipe can either be replaced or repaired. In 2002 the typical coat of replacement of a single flexible pipe used as a dynamic riser is £5 million. Further cost will be incurred through the pipeline being shut down while the repair is carried out. Repairing a pipe in-situ deep underwater is extremely difficult and pipe manufacturers usually advise their customers to take out the damaged pipe section completely and bring it out of the water for repair. Difficulties are caused by the extreme depths at which the pipes are located. At these depths, diver intervention is not usually possible and the pipes can only be accessed using remotely operable vehicles (ROVs). The problem of repairing deep sea pipes is further increased for dynamic risers. If a dynamic section is damaged, repair tools must move with the dynamic section or, alternatively, the repair must be carried out extremely rapidly.

It is known to repair deep sea pipes by placing clamps around any damaged sections. Conventional clamps are placed on a damaged pipe and then tightened, to seal the clamp to the pipe, by using bolts. However, using these bolt clamps is problematical for a number of reasons. Firstly, the installation process is extremely complex and so specialist ROVs and ROV crews are required. Secondly, these types of clamp are very heavy and they change the dynamics of the dynamic risers. Thirdly, pipes and in particular dynamic risers are usually tethered and these tethers provide an obstruction to both the tools for attaching the clamp and the clamp itself.

Another method of repairing damaged pipes deep underwater is to stick a patch with adhesive against the damaged surface. The adhesive used to stick the patch to the pipe is prepared on the surface. There are many problems with this method. Firstly, because the adhesive is prepared at the surface it must be quickly applied to the damaged pipe before the adhesive sets. Secondly, this type of repair is very weak and with a patch installed the maximum operating pressure of the pipe is significantly reduced. Thirdly, although the tooling required to install a patch to a stationary pipe is quite simple, albeit heavy, the ROV tooling required to install a patch using adhesive to a dynamic riser is complex and requires a specialist ROV crew.

There is therefore an enormous demand for a means for repairing a damaged pipe deep underwater, and in particular a dynamic riser, that is quick and simple to install, that can be installed within a confined space and that provides a strong repair.

SUMMARY OF THE INVENTION

According to a first aspect of the present invention there is provided a pipe clamp for repairing an underwater pipe, said pipe clamp comprising: a plurality of part-cylindrical clamp portions, said part-cylindrical clamp portions having longitudinal edges; hinge means, said part-cylindrical clamp portions being coupled together by said hinge means along adjacent pairs of said longitudinal edges, two of said longitudinal edges of said part-cylindrical clamp portions being free of longitudinal edges; and fastening means to hold said free longitudinal edges of said part-cylindrical clamp portions together; wherein said part-cylindrical clamp portions are movable about said hinge means towards and away from one another between an open position, in which said free longitudinal edges are spaced apart and said pipe clamp can be placed around a pipe, and a closed position, in which, in use, said free longitudinal edges of said part-cylindrical portions are brought together around said pipe and said pipe clamp is held to said pipe.

It is an object of the present invention to provide a clamp which is quick and simple to install. The part-cylindrical portions when hinged apart provide a large gap that enables the clamp to be installed around a pipe whilst working within a confined space. The hinging of the part-cylindrical sections to one another means that the sections are at all times aligned relative to one another and do not have to be brought into register in the difficult conditions underwater. The fastening means hold the free edges together to provide a strong repair.

In a preferred embodiment, there are three of the said part-cylindrical portions, a first being hinged to a respective one of the other two part cylindrical portions along each of its longitudinal edges; each of the other part-cylindrical portions being hinged to the first portion on one longitudinal edge and being free on its other longitudinal edge with this arrangement a clamp can be constructed which can be opened to provide a large gap with a small overall clamp dimension when in the open position, so that the clamp can be installed in very confined conditions.

Preferably, the said two other part-cylindrical portions are such that in the closed position each subtends substantially one quarter of the circumference of the pipe clamp.

In a preferred embodiment, the fastening means comprises at least one latch on one of the part-cylindrical portions and at least one latch-engaging surface on another of the part-cylindrical portions, the arrangement being such that, in use, the or each latch is engaged with at least one of the at least one latch-engaging surface to hold the part-cylindrical portions together.

Fastening the part-cylindrical portions together using the latch and latch-engaging surface enables a clamp to be constructed which can be quickly fastened deep underwater using a simple tool.

According to a second aspect of the present invention, there is provided a pipe clamp for repairing an underwater pipe, said pipe clamp comprising: a tubular casing movable between an open position and a closed position, said tubular casing having, in said open position, a longitudinal gap and in said closed position edges of said longitudinal gap are together; at least one latch provided adjacent to one edge of said longitudinal gap; and at least one latch-engaging surface provided adjacent to the other edge of said longitudinal gap, the arrangement being such that, in use, said at least one latch is engaged with said at least one latch-engaging surface to hold said tubular casing in said closed position.

In a preferred embodiment, the at least one latch is biased to engage with the at least one latch-engaging surface. Using such a biasing arrangement means that moving the edges of the longitudinal gap together or the free longitudinal edges of the part-cylindrical portions together can provide sufficient force to engage the or each latch with at least one of the at least one latch-engaging surfaces to hold the edges of the longitudinal gap together or the free longitudinal edges of the part-cylindrical portions together.

In a preferred embodiment, the or each latch has means for engaging with a latch release tool.

The means for engaging with a latch release tool provides the advantage that the or each latch can be easily removed if the clamp is positioned incorrectly on the pipe or if it needs to be removed for any other reason.

Preferably, a plurality of latches are provided and the engaging means include a coupling which couples the latches together such that they can be moved in unison.

Such a coupling has the advantage that, the latches can be moved to engage the latch-engaging surfaces all at the same time. This can make it easier to secure the clamp. Secondly, disengagement of the clamp is simplified because all the latches can be released from the latch-engaging surfaces at the same time.

Preferably, the latch comprises a hook. The latch-engaging surface may be a bar.

Preferably, the pipe clamp is made from stainless steel.

In a preferred embodiment, a sealing surface is provided on the inside surface of the clamp. The sealing surface may be made from a polymeric material, for example, ethylene propylene diene terpolymer.

According to a third aspect of the present invention, there is provided a method of repairing an underwater pipe using a pipe clamp as set out above, said method comprising the steps of: placing said pipe clamp in said open position on said pipe; moving said part-cylindrical clamp portions of said pipe clamp about said hinge means such that said free longitudinal edges of said part-cylindrical clamp portions are brought together to form a cylinder around said pipe; and fastening said free ends of said part-cylindrical portions together, such that said pipe clamp is held to said pipe over a section of said pipe to be repaired.

According to a fourth aspect of the present invention, there is provided a method of repairing an underwater pipe using a pipe clamp as set out above, said method comprising the steps of: placing said tubular casing on said pipe over a section of said pipe to be repaired, said pipe passing through said longitudinal gap; and engaging said at least one latch with at least one latch-engaging surface to hold said edges of said longitudinal gap together.

According to a fifth embodiment of the present invention, there is provided a pipe clamp for repairing an underwater pipe, said pipe clamp comprising: a plurality of part-cylindrical clamp portions, said part-cylindrical clamp portions having longitudinal edges; hinge means, said part-cylindrical clamp portions being coupled together by said hinge means along adjacent pairs of said longitudinal edges, two of said longitudinal edges of the part-cylindrical clamp portions being free longitudinal edges; at least one latch provided on at least one of said part-cylindrical portions and at least one latch-engaging surface provided on another of said part-cylindrical portions; and fastening means to hold said free longitudinal edges of said part-cylindrical clamp portions together; wherein said part-cylindrical clamp portions are movable about said hinge means towards and away from one another between an open position, in which said free longitudinal edges are spaced apart and said pipe clamp can be placed around a pipe, and a closed position in which, in use, said free longitudinal edges of said part-cylindrical portions are brought together around said pipe, said at least one latch is engaged with said at least one latch-engaging surface to hold said part-cylindrical portions together; and said pipe clamp is held to said pipe.

According to a sixth aspect of the present invention, there is provided a method of repairing an underwater pipe using a pipe clamp as set out above, said method comprising the steps of: placing said pipe clamp in said open position on said pipe; moving said part-cylindrical clamp portions of said pipe clamp about said hinge means such that said free longitudinal edges of said part-cylindrical clamp portions are brought together to form a cylinder around said pipe; engaging said at least one latch with said at least one latch-engaging surface to hold said free longitudinal edges together, such that said pipe clamp is held to said pipe over a section of said pipe to be repaired.

BRIEF DESCRIPTION OF THE DRAWINGS

An embodiment of the present invention will now be described with reference to and as illustrated by the accompanying drawings, in which.

DETAILED DESCRIPTION

Figure 1:
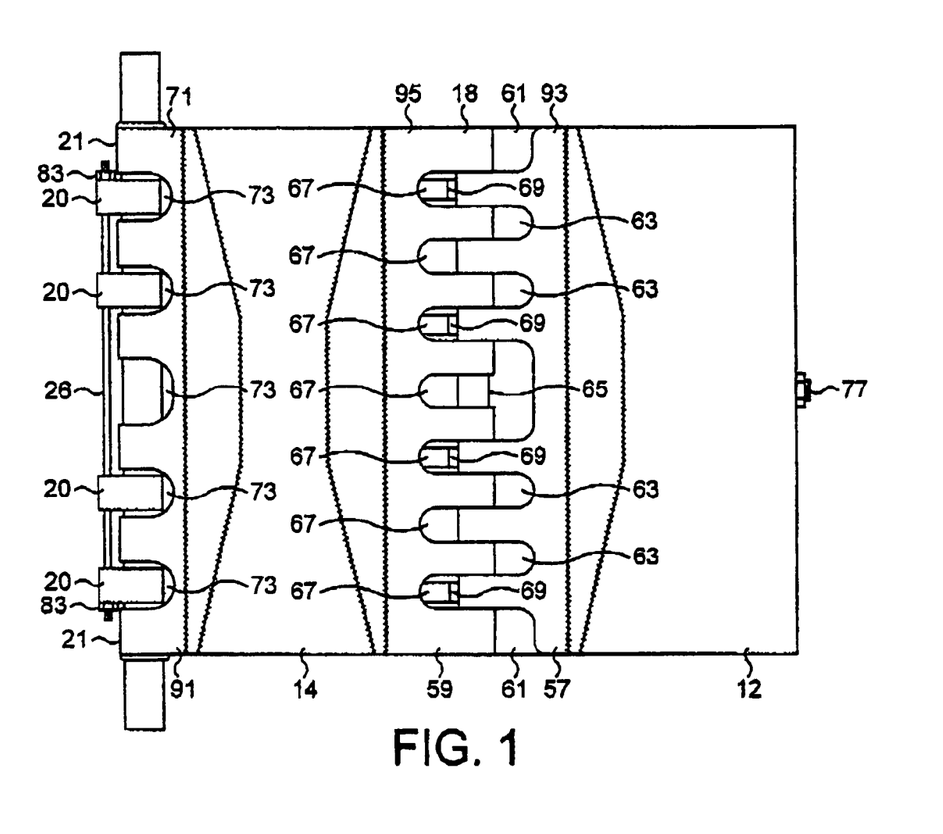
FIG. 1 shows a front elevation of a clamp, in accordance with th present invention, in the closed position.
Figure 2:
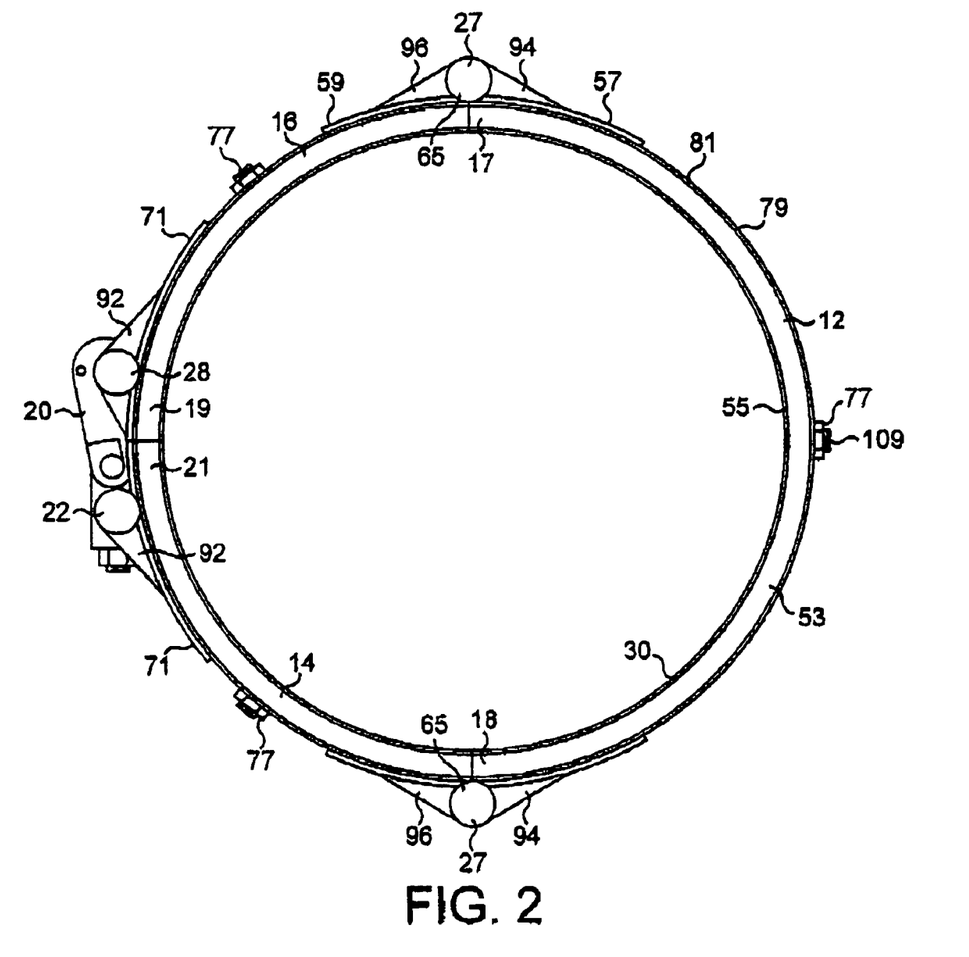
FIG. 2 shows a plan view of the clamp of FIG. 1 from below.
Figure 3:
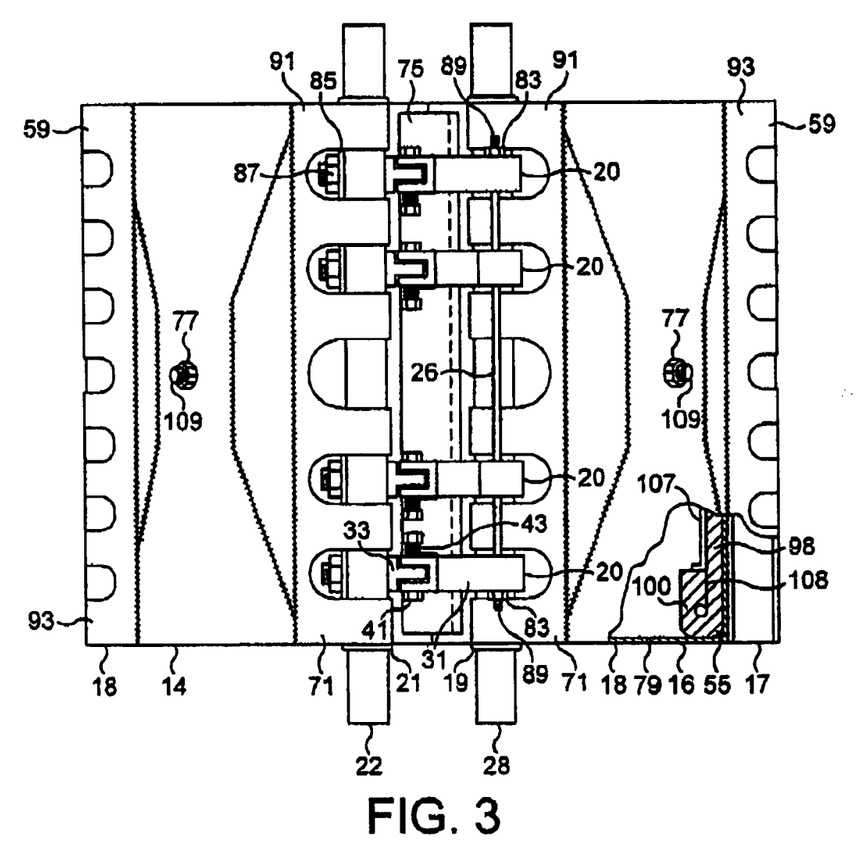
FIG. 3 shows a side elevation of the clamp of FIGS. 1 and 2.

Referring to FIGS. 1 to 3, a pipe clamp 10 is shown comprising three part-cylindrical portions 12,14,16 hinged together along adjacent longitudinal edges 17,18. A first of the part-cylindrical portions 12 is hinged to a respective one of the other two part-cylindrical portions 14,16 along each of its longitudinal edges 17,18 by hinges 27. Each of the other part-cylindrical portions 14,16 is hinged to the first part-cylindrical portion 12 on one longitudinal edge 17,18, its other longitudinal edge 19,21 is free. The first part-cylindrical portion 12 subtends one half of the circumference of the pipe clamp 10. The other two part-cylindrical portions 14,16 each subtend one quarter of the circumference of the, pipe clamp 10, when the pipe clamp 10 is in a closed position (as shown in FIGS. 1 to 3).

The part-cylindrical portions 14,16 are movable about the hinge axes 27 towards and away from one another between an open position in which the free longitudinal edges 19,21 are spaced apart and the closed position in which the free longitudinal edges 19,21 are together.

Fastening means are provided for holding the free edges 19,21 of the part-cylindrical portions 14,16 together. The fastening means comprise a latch provided at one of the part-cylindrical portions 14 and a latch-engaging surface provided on another of the part-cylindrical portions 16. When the clamp 10 is in the closed position, the latch engages with the latch-engaging surface to hold the part-cylindrical portions 14,16 together.

Each part-cylindrical portion 12,14,16 comprises an outer casing 53 and an inner seal 55. The casing 53 has a flange 79 projecting inwardly towards the centre of the clamp 10 along each end rim 81. The seal 55 comprises a web portion 98 extending across the inner surface of the casing 53, and sealing lips 100 projecting inwardly towards the centre axis of the clamp 10 along each of the web portions 98. The outside edge of the lip 100 abuts an inner side of the flange 79. The surface of the lip 100 closest to the axis forms the sealing surface. A portion 108 of the lips projects axially towards the inside of the seal and is thicker at its inner end.

Each part-cylindrical portion 12,14,16 has a separate seal segment. The sealing segments provide the inner sealing surface. The seal segments are held in place on their corresponding part-cylindrical portion 12,14,16 by part-cylindrical locating tongues 107 of sheet steel which are secured by bolts 109 which pass through aligned holes in the tongues 107, the sealing segments and outer casing 53 and are fastened by nuts 77.

In the embodiment of FIGS. 1 to 3, the latch comprises four hook assemblies 20 and the latch-engaging surface comprises a latch bar 28. The hook assemblies 20 are arranged to engage with the latch bar 28 to fasten the part-cylindrical portions 14,16 together.

Figure 4:
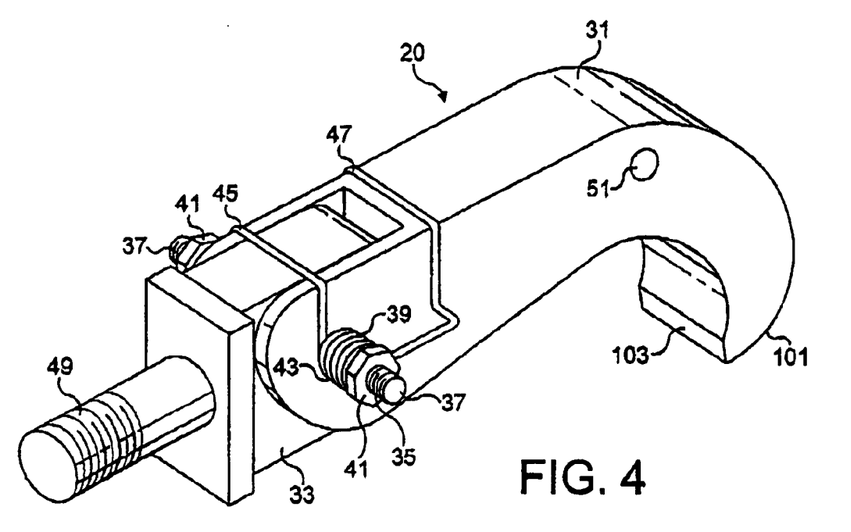
FIG. 4 shows a perspective view of a hook assembly of the clamp of FIGS. 1 to 3.

As shown in FIG. 4, each hook assembly 20 comprises a hook 31 which is rotatably connected to a clevis 33 by a clevis pin 35. A nut 41 is threaded onto a screw thread 37 at each end of the clevis pin 35 to hold the pin 35 in position. One end of the clevis pin 35 passes through the coil 43 of a coil spring 39. The coil spring 39 has two arms 45,47. One arm 45,47 projecting from each end of the coil 43. The first arm 45 on the hook side of the coil 43 bears on the top surface of the clevis 33 and the second arm 47 on the nut 41 side of the coil 43 bears on the top surface of the hook 31. The coil spring 39 biases the hook 31 to rotate about the axis of the clevis pin 35 in a direction towards the outer casing 53.

The clevis 33 has a threaded shaft 49 protruding away from the hook 31. Each hook assembly 20 is attached to a clevis bar 22 by the threaded shaft 49. The clevis bar 22 has four holes through it (not shown). The threaded end of each of the threaded shafts 49 passes through a respective hole in the clevis bar 22. A washer 85 and a nut 87 are screwed to the threaded shaft 49 to hold each hook assembly 20 in place.

The hooks 31 of the four hook assemblies 20 are joined together by a release bar 26 which passes through a hole 51 located towards the free end of each hook 31. The release bar 26 has threaded ends 89 and is held in place by nuts 83 screwed onto the thread 89 at each end. The release bar 26 enables the four hooks 31 to be rotated in unison.

Referring now to FIGS. 1 to 3, a lock part unit 71 is shown attached to the free edge of each part-cylindrical portion 14,16. Each lock part unit 71 comprises a rectangular sheet 91 having five elongate slots 73 passing through it spaced along the longitudinal axis of the sheet 91. The sheet 91 is bent around a longitudinal axis passing through the elongate slots 73 to form a loop 92.

The lock part unit 71 is attached to the free edge of the part-cylindrical portion 14 and houses the clevis bar 22 within the loop 92. Each of the four hook assemblies 20 protrudes from an elongate slot 73. No hook assembly 20 protrudes from the middle of the five slots 73. The clevis bar 22 protrudes beyond the end rim 81 of the clamp 10 to provide means for attachment to a tool 24 for securing the pipe clamp 10.

The other lock part unit 71 is attached to the other free edge of the part-cylindrical portion 16 and houses a latch bar 28. The latch bar 28 is exposed through the elongate slots 73 to provide the latch-engaging surfaces which cooperate with the hooks 31. The latch bar 28 protrudes beyond the end rim 81 of the clamp 10 to provide means for attachment to the tool 24 for securing the pipe clamp 10.

Hinge units 57,59 are attached to the longitudinal edges 17,18 and the outer casing 53 of each part-cylindrical portion 12,14,16 to form the hinges 27. Each hinge unit 57 comprises a rectangular sheet 93 having an elongate recess 61 in each transverse edge and elongate slots 63 spaced parallel to the longitudinal edge of the hinge unit 57. The sheet 93 is folded on itself about a longitudinal axis which passes through each of the elongate recesses 61 and elongate slots 63 to form a loop 94. The loop 94 between the folded faces of the sheet 93 houses a hinge bar 65.

Each edge of the part-cylindrical portions 14,16 that is not free has a complementary hinge unit 59 attached to it. Each of the complementary hinge units 59 comprises a rectangular sheet 95 having elongate slots 67 spaced along the longitudinal axis of the sheet 95. The sheet 95 is folded on itself about a longitudinal axis that passes through each of the elongate slots 67 to form a loop 96. The loop 96 houses the hinge bar 65.

The complementary hinge unit 59 has four bar brackets 69. The bar brackets 69 have an L-shape cross-section and are mounted within the loop 96. The bar brackets 69 are spaced along the longitudinal axis of the sheet 95 and are positioned below the elongate slot 67 closest to the transverse edge of the sheet 95 and below alternate elongate slots 67. The hinges 27 are formed by inserting the hinge bars 65 in the interengaging loops of hinge units 57. The bar brackets 69 prevent movement of the longitudinal edges of the hinge unit 57 and the complementary hinge unit 59 towards each other.

The lock part unit 71 and the hinge units 57,59 are attached to the outer casing 53 by welding.

A joint flap 75 is attached to the free longitudinal edge of the part-cylindrical portion 16. The joint flap 75 is a rectangular sheet, the longitudinal edge of which extends beyond the free longitudinal edge 19 of the part-cylindrical portion 16 so as to overlap the longitudinal edge 21 of the part-cylindrical portion 14 when the clamp 10 is in the closed position.

Figure 6:
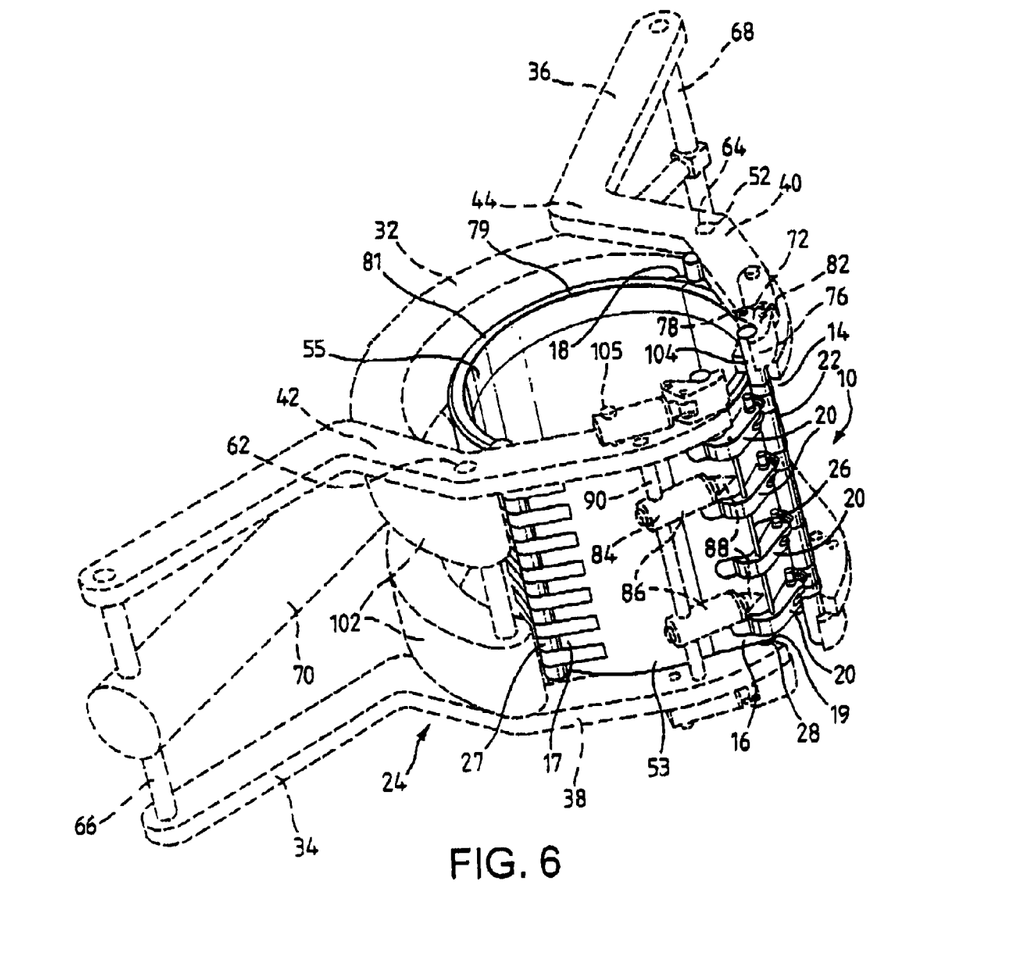
FIG. 6 shows another perspective view of the clamp and tool of FIG. 5 with the clamp in the closed position.

To install the pipe clamp 10, it is placed in its open position and offered to the damaged pipe. The first part-cylindrical portion 12, that subtends one half of the circumference of the pipe clamp 10, is placed against the damaged pipe. The damaged portion of the pipe is located within the length of the pipe subtended by the length of the pipe clamp 10. Once in place against the pipe, the other two part-cylindrical portions 14,16, that each subtend one quarter of the circumference of the pipe clamp 10, are hinged about their respective hinge axes 27, to close the clamp 10 against the pipe. When the curved surface 101 at the leading end of the hooks 31 come into contact with the latch bar 28, the hooks 31 are lifted against their springs 39 by the camming action of the sloping surface of the hooks 31 on the latch bar 28. As the part-cylindrical portions 14,16 are moved yet closer together and the longitudinal edges of the portions 14 and 16 abut one another, the hooks 31 drop down onto the latch bar 28 so that the latch bar 28 sits in the recess 103 of hooks 31. The force moving the part-cylindrical portions 14,16 together is then removed. The resilience of the seal 55 provided on the inside surface of the clamp 10 tends to open the part-cylindrical portions 14,16. This bias forces in the recesses of the hooks 31 to engage the latch bar 28 so that the clamp 10 is securely held to the pipe. FIG. 6 shows the clamp 10 in the closed position.

After installation, the clamp 10 can be removed from the pipe if necessary, as follows. A force is applied to the clamp 10 squeezing the longitudinal free edges 19,21 together. The release bar 26 is then moved away from the casing 53 against the biasing force of the coil springs 39 lifting the hooks 31 clear of the latch bar 28. The two part-cylindrical portions 14,16 are then hinged open. The clamp 10 can then be removed from around the pipe.

Figure 5:
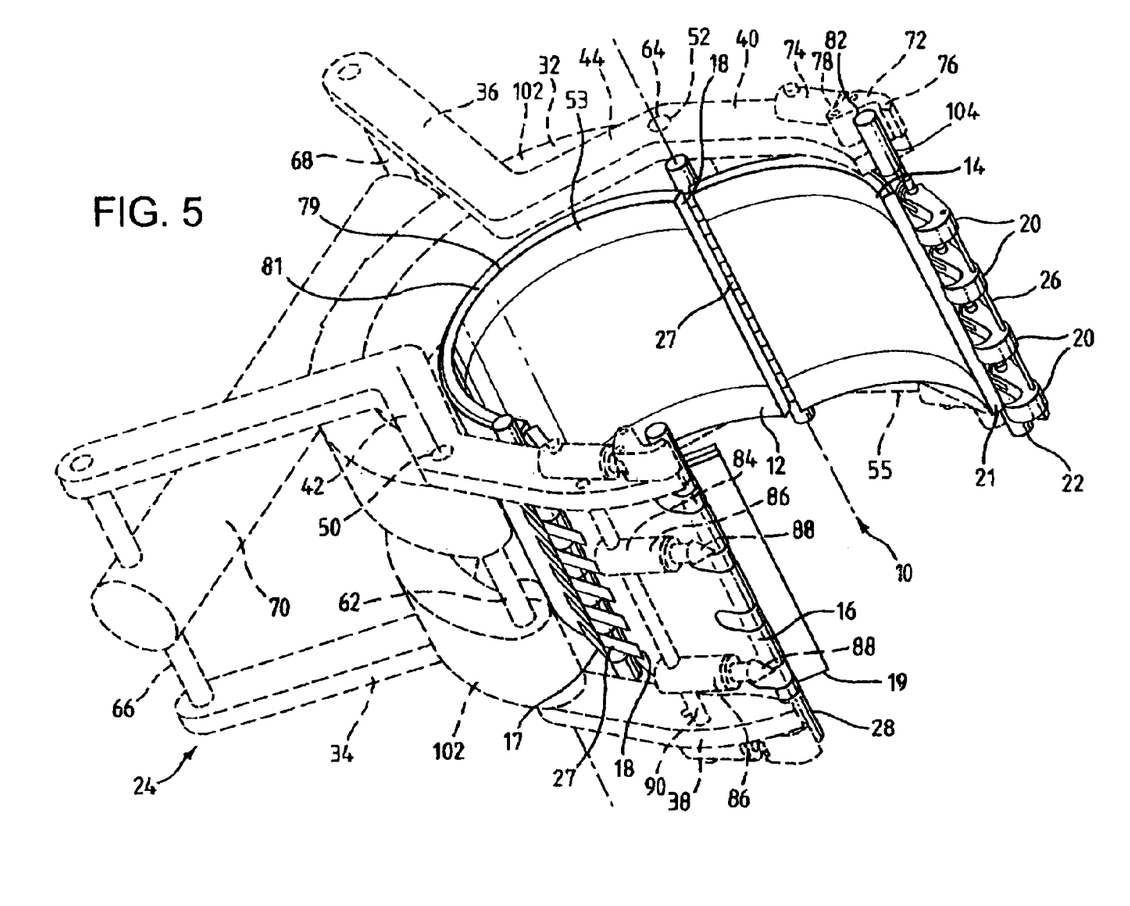
FIG. 5 shows a perspective view of the clamp of FIGS. 1 to 3, in the open position, with a tool for securing the pipe clamp.

FIGS. 5 and 6 show a tool 24 for securing the pipe clamp 10 to an underwater pipe. The tool 24 comprises a yoke 32 and two pairs of arms 34,36. Each arm 34,36 has a gripping portion 38,40 and an actuating portion 42,44. Each arm 34,36, at a point between the gripping portion 38,40 and the actuating portion 42,44, is pivotally attached to the yoke 32. The arms 34,36 are movable about the pivot axes 50,52 between a first position and a second position.

The actuating portions 42,44 of each pair of arms 34,36 are connected together by an axle 66,68 extending between them. The two axles 66,68 are interconnected by a hydraulic actuator 70. The pairs of arms 34,36 can be moved apart and together, from the first position to the second position, by retracting and extending the hydraulic actuator 70.

Means 72 for attaching the tool to the clamp 10 are positioned on the outside of the free end of each gripping portion 38,40 of each arm 34,36. Each attaching means 72 comprises an engagement portion 76 and a hydraulic actuator 74. Each engagement portion 76 is mounted on a pivot pin 78 which connects it to its respective arm 34,36. There is a concave recess 104 in the end of each gripping portion 38,40. The engagement portions 76 each have a concave curve surface 82 on the side that faces the opposing pair of arms 34,36. Each of the protrusions of the clevis bar 22 and the latch bar 28 from the pipe clamp 10 can be clasped between one of the concave curve surfaces 82 and one of the concave recesses 104.

The tool 24 is used to fit the clamp 10 to the pipe. As shown in FIG. 5, the pipe clamp 10 is placed between the arms 34,36 of the tool 24. The tool 24 is then attached to an ROV. This operation is completed on the deck of a ship from which the ROV will be launched. The arms 34,36 are in the first position because the hydraulic actuator 70 is retracted. The gripping portions 38,40 of the arms 34,36 of the tool 24 hold the pipe clamp 10 in the open position between the arms 34,36. Each of the protrusions of the clevis bar 22 and the latch bar 28 that extend beyond the end rim 81 of the clamp 10 sit in one of the concave recesses 104 and the concave curved surface 82 of the engagement portion 16.

Referring now to FIG. 6, the attaching means 72 are operated by extending each associated hydraulic actuator 74 to pivot the engagement portion 76 about the pivot pin 78 so that the concave surface 82 moves around the protrusions of the clevis bar 22 and latch bar 28. This causes the protrusions of the clevis bar 22 and the latch bar 28 that extend beyond the end rim 81 of the clamp 10 to be clasped between the end face of the tool 24 and the concave curve surface 82 of the attaching means 72. In this position the clamp 10 can be manipulated by the tool 24.

The ROV with the tool 24 and clamp 10 attached is launched into the sea and the open side of the clamp 10 is offered to the damaged pipe. The position of the clamp 10 is viewed by cameras mounted to the ROV and the alignment of the clamp 10 is verified from the images transmitted from the cameras to the ROV operator. The first part-cylindrical portion 12, that subtends one half of the circumference of the pipe clamp 10, is placed against the damaged pipe. The hydraulic actuator 70 is then extended and the arms 34,36 are moved from the first position to the second position. The movement of the arms 34,36 secure the clamp 10 to the pipe as described above.

The position of the clamp 10 is again verified by the ROV cameras and once the clamp 10 is securely fastened to the pipe, the tool 24 is detached from the clamp 10 by retracting the hydraulic actuator 74 of each attaching means 72. This causes the engagement portions 76 to release the protrusions of the clevis bar 22 and the latch bar 28 from their clasping position between the concave recesses 104 and the concave curve surface 82 of the engagement portion 76. The hydraulic actuator 70 is retracted and the arms 34,36 of the tool 24 are moved into the second position. The tool 24 is then moved away from the clamp 10.

The tool 24 has a latch release portion 84 for releasing the clamp 10 comprising hydraulic actuators 86 with conical ends 88.

The arms 34,36 of the tool 24 are attached to the clamp 10 by the attachment means 72. The tool 24 and clamp 10 are now in the position as shown in FIG. 6. The position of the tool 24 and the clamp 10 is verified by the ROV's cameras. The actuator 70 is fully extended, the force of the arms 34,36 against the clamp 10 resulting in reduction of the bias force that causes the hooks 31 to engage with the latch bar 28. The hydraulic actuators 86 of the latch release portion 84 are activated causing the conical ends 88 to bear on the release bar 26. The hooks 31 are disengaged from the latch bar 28 and they are lifted against their springs 39 clear of the latch bar 28. The arms 34,36 of the tool 24 are moved into the second position and the two part-cylindrical portions 14,16 are hinged open. The clamp 10 can then be removed from the pipe completely by moving the tool 24 away. Alternatively, the clamp 10 can be repositioned by sliding the clamp 10 along the pipe.

Each clamp 10 may be made-to-measure to fit the dimensions of a particular damaged pipe. In this case, the diameter of the damaged pipe is first measured using, for example, calipers mounted on an ROV. Other dimensions, for example, the size of a hole in the damaged pipe may also be measured. Once the dimensions required for the clamp 10 are known, the clamp 10 is manufactured to these dimensions.

The clamp 10 may be transported to the vicinity of the damaged pipe either in the open position or the closed position.

The outer casing 53 may preferably be made from duplex stainless steel and more preferably from Zeron 100®. Zeron 100® has the following minimum chemical composition: 24.0% Cr, 6.0% Ni, 3.0% Mo, 0.5% W, 0.5% Cu, 0.2% N and the balance Fe and the following maximum chemical composition: 0.03% C, 1.0% Si, 1.0% Mn, 0.01% S, 0.03% P, 26.0% Cr, 8.5% Ni, 4.0% Mo, 1.0% W, 1.0% Cu, 0.3% N and the balance Fe.

The inner seal surface 55 is preferably made from ethylene propylene diene terpolymer.

Spacers may be located between the clevis 33 and the clevis bar 22 in order to change the diameter of the clamp 10 when the clamp 10 is in the closed position.

An embodiment of the present invention has been described with particular reference to the example illustrated. However, it will be appreciated that variations and modifications may be made to the example described within the spirit and scope of the present invention.

The first of the part-cylindrical portions 12 that is hinged to a respective one of the other two part-cylindrical portions 14,16 along each of its longitudinal edges 17,18 may subtend less than half the circumference of a cylinder.

Fastening means other than the latch (a hook assembly 20 in the example described above) and at least one latch-engaging surface (a latch bar 29 in the example described above) may be used to fasten the free ends 19,21 of the clamp 10 together. For example, the free ends 19,21 of the clamp 10 may be fastened together by a nut and bolt or the free ends 19,21 of the clamp 10 may be riveted together.

What is claimed is:

1. A pipe clamp for repairing an underwater pipe, comprising:
    first, second and third part-cylindrical clamp portions each having a pair of longitudinal edges, each said longitudinal edge of said first clamp portion being connected to an adjacent said longitudinal edge of each of said second and third clamp portions by a hinge, said longitudinal edges of said second and third clamp portions remote from said first clamp portion defining respective free longitudinal edges of said second and third clamp portions;
    a resilient and compressible seal arrangement disposed on an inner surface of said pipe clamp; and
    a fastening arrangement for holding said free longitudinal edges together, said fastening arrangement including a plurality of latches disposed on at least one of said clamp portions and a plurality of latch-engaging surfaces disposed on another of said clamp portions, and a coupling which couples said plurality of latches together for movement in unison with one another, wherein said clamp portions are movable about the respective said hinges towards and away from one another between an open position in which said free longitudinal edges are spaced-apart from one another to allow placement of said pipe clamp around a pipe, and a closed position in which said free longitudinal edges are brought together around a pipe causing said latches to fasten to said latch-engaging surfaces and said pipe clamp to be held to a pipe.

2. The pipe clamp of claim 1, wherein in said closed position said second and third clamp portons each subtend substantially one-quarter of a circumference of said pipe clamp.

3. The pipe clamp of claim 1, wherein said latches are biased to automatically engage with said latch-engaging surfaces when said free longitudinal edges are moved into said closed position.

4. The pipe clamp of claim 1, wherein said fastening arrangement is configured to engage with a latch-release tool.

5. The pipe clamp of claim 1, wherein said coupling comprises an elongate bar.

6. The pipe clamp of claim 1, wherein said latches are hook-shaped.

7. The pipe clamp of claim 1, wherein said fastening arrangement includes an elongate bar defining said latch-engaging surface thereon.

8. The pipe clamp of claim 1, wherein said portions are constructed of stainless steel, and said seal arrangement is constructed of a polymeric material.

9. The pipe clamp of claim 1, wherein said seal arrangement is constructed of ethylene propylene diene terpolymer.

10. The pipe clamp of claim 1, wherein said seal arrangement is defined by a plurality of separate and pre-formed seal segments each corresponding to one of said clamp portions.

11. A pipe clamp for repairing an underwater pipe comprising:
    a plurality of part-cylindrical clamp portions each having a pair of longitudinal edges and a pair of end rims, said clamp portions being coupled together by hinges along adjacent pairs of said longitudinal edges, two of said longitudinal edges of said clamp portions being free longitudinal edges;
    a fastening arrangement for holding said free longitudinal edges of said clamp portions together; and
    projections extending transversely from respective end rims of ones of said clamp portions having said free longitudinal edges and being disposed generally adjacent said free longitudinal edges, said clamp portions being movable about said hinges towards and away from one another between an open position in which said free longitudinal edges are spaced-apart to allow placement of said pipe clamp around a pipe, and a closed position in which said free longitudinal edges are brought together around a pipe by an actuator which clasps said projections, the fastening arrangement is fastened, and said pipe clamp is held to a pipe.

12. The pipe clamp of claim 11, wherein said plurality of clamp portions comprises three part-cylindrical clamp portions, a first of said clamp portions along each said longitudinal edge thereof being hinged to respective adjacent longitudinal edges portions of second and third ones of said clamp portions, said free longitudinal edges being defined on said second and third clamp portions remote from said first clamp portion.

13. The pipe clamp of claim 12, wherein said second and third clamp portions in said closed position each subtend substantially one-quarter of a circumference of said pipe clamp.

14. The pipe clamp of claim 11, wherein each said projection is barshaped and projects transversely from the respective said end rim.

15. The pipe clamp of claim 11, further including a pre-formed resilient sealing sleeve disposed adjacent inner surfaces of the respective clamp portions.

16. The pipe clamp of claim 15, wherein said sealing sleeve is defined by respective separate sealing segments, each said sealing segment being disposed on said inner surface of one of said clamp portions.

17. A method of repairing an underwater pipe using a pipe clamp according to claim 20, said method comprising the steps of:
    placing said pipe clamp in said open position on a pipe;
    moving said clamp portions of said pipe clamp about said hinges such that said free longitudinal edges of said clamp portions are brought together to form a cylinder around the pipe, and automatically engaging said latch with said latch-engaging surface to hold said free longitudinal edges together such that said pipe clamp is held to the pipe over a section thereof to be repaired.

18. A method of repairing an underwater pipe using a pipe clamp according to claim 11, said method comprising the steps of:
    placing said pipe clamp in said open position on a pipe;
    with said actuator, clasping said projections and moving said clamp portions of said pipe clamp about said hinges to bring said free longitudinal edge portions together to form a cylinder configuration about the pipe; and
    fastening said fastening arrangement to hold said free longitudinal edges together, such that said pipe clamp is held to the pipe over a section thereof to be repaired.

19. A pipe clamp for repairing an underwater pipe comprising:
    first, second and third clamp portions each having a pair of spaced-apart and generally arcuate end edges and a pair of spaced-apart longitudinal edges extending transversely between the respective end edges, one of said longitudinal edges of each of said first and second clamp portions being pivotably connected to one of said longitudinal edges of said third clamp portion, and the other said longitudinal edge of each of said first and second clamp portions being a free longitudinal edge, said free longitudinal edges being movable towards one another to define a closed position of said pipe clamp wherein said pipe clamp has a cylindrical configuration for disposal about a pipe, and movable away from one another to define an open position of said pipe clamp; and a latch arrangement disposed to interconnect said free longitudinal edges of said first and second clamp portions to place said pipe clamp in said closed position, said latch arrangement including a plurality of latch members disposed adjacent one of said free longitudinal edges and a plurality of latch-engaging surfaces disposed adjacent the other of said free longitudinal edges, and a coupling which couples said plurality of latches together for movement in unison with one another, said latch members being biased in a direction towards a central axis defined by said pipe clamp to cause automatic locking engagement of said latch member with said latch-engaging surfaces when said pipe clamp is moved into said closed position.

20. The pipe clamp of claim 19, wherein said latch arrangement comprises a biasing member disposed to bias said latch members towards the central axis, and said latch members are lockingly engaged with said latch-engaging surfaces solely through the biasing force exerted by said biasing member.

21. The pipe clamp of claim 19, wherein said latch members are disposed along said one longitudinal edge and are pivotable relative thereto, and said latch arrangement comprises an elongate latching bar positioned along said other longitudinal edge, said latching bar defining said plurality of latch-engaging surfaces therealong with which the respective latch members engage in said closed position of said pipe clamp.

22. The pipe clamp of claim 21, wherein said coupling includes an elongate release bar connected to each said latch member to allow same to be pivoted in unison for disengaging said latch members from their respective latch-engaging surfaces to place said pipe clamp in said open position.

23. The pipe clamp of claim 21 wherein said coupling includes an elongate post secured along said one longitudinal edge in generally parallel relation therewith, and said latch members are pivotably mounted on said post, each said latch member defining a hook-shaped terminal end defining a recess therein which opens toward the central axis and is configured for receiving an outer surface of said latching bar therein.

24. The pipe clamp of claim 23, wherein each of said post and said latching bar extends beyond the respective end edge of the corresponding first and second clamp member to define a projection for cooperation with an actuator used to install said pipe clamp on a pipe.

25. The pipe clamp of claim 19, wherein each said latch member defines a cam surface thereon which automatically engages with said latch-engaging surface when said pipe clamp is moved into said closed position.

26. The pipe clamp of claim 25, wherein said cam surface, upon initial engagement with said latch-engaging surface, is configured to cause pivoting movement of said latch member in a direction opposite the biasing direction, and then allow pivoting movement of said latch member toward the central axis and into locking engagement with said latch-engaging surface.

27. A pipe clamp for repairing an underwater pipe comprising: first, second and third part-cylindrical clamp portions each having a pair of longitudinal edges and a pair of end rims oriented transversely to said longitudinal edges, each said longitudinal edges of said first claim portion being connected to an adjacent said longitudinal edge of each of said second and third clamp portions by a hinge, said longitudinal edges of said second and third clamp portions remote from first clamp portion defining respective free longitudinal edges of said second and third clamp portions, said second and third portions each including a projection extending transversely from one said end rim thereof;

a resilient and compressible seal arrangement disposed on an inner surface of said pipe clamp; and a fastening arrangement for holding said free longitudinal edges together, said fastening arrangement including at least one latch disposed on at least one of said clamp portion and at least one latch-engaging surface disposed on another of said clamp portions, wherein said clamp portions are moveable about the respective said hinges towards and away from one another between an open position in which said free longitudinal edges are spaced-apart from one another to allow placement of said pipe clamp around a pipe, and a closed position in which said free longitudinal edges are brougth together around a pipe causing said latch to fasten to said latch-engaging surface and said pipe claim to be held to a pipe, said projections being configured for being clasped by an actuator to bring said free longitudinal edges into a closed position.

28. The pipe clamp of claim 27, wherein each said projection comprises a bar which extends transversely from the respective said end rim in alignment with the respective said longitudinal edge.

* * * * *